(12) United States Patent
Julian et al.

(10) Patent No.: US 12,185,679 B2
(45) Date of Patent: Jan. 7, 2025

(54) CONTROL SYSTEMS FOR AUTONOMOUS AQUACULTURE STRUCTURES

(71) Applicant: TidalX AI Inc., San Ramon, CA (US)

(72) Inventors: Dominico P. Julian, Oakland, CA (US); Charles Nordstrom, Grosse Pointe Park, MI (US); Jeff Zerger, Pacifica, CA (US); Joel Fraser Atwater, Danville, CA (US); Benjamin Lundquist Saenz, Berkeley, CA (US)

(73) Assignee: TidalX AI Inc., Mountain View, CA (US)

( * ) Notice: Subject to any disclaimer, the term of this patent is extended or adjusted under 35 U.S.C. 154(b) by 0 days.

(21) Appl. No.: 17/990,275

(22) Filed: Nov. 18, 2022

(65) Prior Publication Data

US 2023/0329165 A1    Oct. 19, 2023

Related U.S. Application Data

(63) Continuation of application No. 17/232,851, filed on Apr. 16, 2021, now Pat. No. 11,533,861.

(51) Int. Cl.
| | | |
|---|---|---|
| *A01G 33/00* | (2006.01) | |
| *A01D 44/00* | (2006.01) | |
| *G05B 13/02* | (2006.01) | |
| *G05D 1/00* | (2024.01) | |

(52) U.S. Cl.
CPC ......... *A01G 33/00* (2013.01); *G05B 13/0265* (2013.01); *G05D 1/0206* (2013.01); *A01D 44/00* (2013.01)

(58) Field of Classification Search
CPC .. A01G 33/00; G05B 13/0265; G05D 1/0206; G05D 2201/0201; A01D 44/00
See application file for complete search history.

(56) References Cited

U.S. PATENT DOCUMENTS

| | | |
|---|---|---|
| 3,230,967 A | 1/1966 | Castro |
| 3,730,120 A | 5/1973 | Dobell |
| 4,744,331 A | 5/1988 | Whiffin |
| 6,481,378 B1 | 11/2002 | Zemach |
| 7,320,289 B1 | 1/2008 | Clarke |
| 8,028,660 B2 | 10/2011 | Troy |

(Continued)

FOREIGN PATENT DOCUMENTS

| | | |
|---|---|---|
| CL | 2019000039 A1 | 3/2019 |
| CN | 108040948 | 5/2018 |

(Continued)

OTHER PUBLICATIONS

Extended Search Report in European Appln. No. 22151132.2, dated May 2, 2022, 10 pages.

(Continued)

*Primary Examiner* — Aaron L Troost
(74) *Attorney, Agent, or Firm* — Fish & Richardson P.C.

(57) ABSTRACT

Methods, systems, and computer-readable media that implement an autonomous or semi-autonomous growth platform used to control live cargo exposures to environmental parameters by changing depth in an offshore environment. For example, the growth platform can be lowered at night so that farmed seaweed can perform luxury uptake of nutrients and raised during the daytime so that the farmed seaweed can capture sunlight.

17 Claims, 4 Drawing Sheets

(56) References Cited

U.S. PATENT DOCUMENTS

| | | | |
|---|---|---|---|
| 9,469,383 | B1 | 10/2016 | Cooper et al. |
| 9,655,347 | B2 | 5/2017 | Troy |
| 9,908,593 | B2 | 3/2018 | Cooper et al. |
| 10,095,232 | B1* | 10/2018 | Arbuckle ............... B63H 25/42 |
| 10,099,759 | B1 | 10/2018 | Mehta |
| 10,191,489 | B1* | 1/2019 | Rapoport ............ G05D 1/0692 |
| 10,599,147 | B1 | 3/2020 | Rapoport et al. |
| 10,856,520 | B1 | 12/2020 | Kozachenok et al. |
| 2006/0096548 | A1 | 5/2006 | Ytterland |
| 2006/0102087 | A1 | 5/2006 | Page |
| 2006/0102088 | A1 | 5/2006 | Wroldsen |
| 2008/0133131 | A1 | 6/2008 | Poreda |
| 2009/0162455 | A1 | 6/2009 | Koppe |
| 2009/0235870 | A1 | 9/2009 | Troy |
| 2010/0154298 | A1 | 6/2010 | Albus et al. |
| 2012/0006277 | A1 | 1/2012 | Troy et al. |
| 2012/0072038 | A1 | 3/2012 | Kolar |
| 2012/0192779 | A1 | 8/2012 | Teppig |
| 2013/0156816 | A1 | 6/2013 | Stobbs |
| 2013/0206078 | A1 | 8/2013 | Melberg |
| 2014/0129031 | A1 | 5/2014 | Carter |
| 2014/0319076 | A1 | 10/2014 | Galushko |
| 2016/0007577 | A1 | 1/2016 | Constantz |
| 2016/0221186 | A1 | 8/2016 | Perrone |
| 2016/0244130 | A1 | 8/2016 | Mood |
| 2017/0150701 | A1 | 6/2017 | Gilmore et al. |
| 2017/0295759 | A1 | 10/2017 | Hine |
| 2018/0005178 | A1 | 1/2018 | Gollu |
| 2018/0160658 | A1 | 6/2018 | Lyngoy |
| 2018/0310531 | A1 | 11/2018 | Hickson |
| 2018/0310532 | A1* | 11/2018 | Hickson ................. G06Q 50/02 |
| 2019/0228218 | A1 | 7/2019 | Barnaby et al. |
| 2019/0239487 | A1 | 8/2019 | Brosh |
| 2019/0340440 | A1 | 11/2019 | Atwater et al. |
| 2020/0107524 | A1 | 4/2020 | Messana et al. |
| 2020/0155882 | A1 | 5/2020 | Tohidi et al. |
| 2020/0288678 | A1 | 9/2020 | Howe et al. |

FOREIGN PATENT DOCUMENTS

| | | |
|---|---|---|
| EP | 2244934 | 11/2010 |
| EP | 3484283 | 5/2019 |
| GB | 2493699 | 2/2016 |
| JP | 2002171853 | 6/2002 |
| NO | 300401 | 5/1997 |
| NO | 20160199 | 8/2017 |
| WO | WO 1990/007874 | 7/1990 |
| WO | WO 1997/019587 | 6/1997 |
| WO | WO 2002/040125 | 5/2002 |
| WO | WO 2005/117573 | 12/2005 |
| WO | WO 2007/042861 | 4/2007 |
| WO | WO 2007042860 | 4/2007 |
| WO | WO 2009/008733 | 1/2009 |
| WO | WO 2009/097057 | 8/2009 |
| WO | WO2012081990 | 6/2012 |
| WO | WO 2014/179482 | 11/2014 |
| WO | WO2017137896 | 8/2017 |
| WO | WO 2018/011744 | 1/2018 |
| WO | WO2018011745 | 1/2018 |
| WO | WO 2019/002881 | 1/2019 |
| WO | WO 2019/121851 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

International Preliminary Report on Patentability in International Appln. No. PCT/US2020/059829, dated May 27, 2022, 11 pages.

International Search Report and Written Opinion in International Appln. No. PCT/US2020/059829, dated Feb. 25, 2021, 18 pages.
International Search Report and Written Opinion in International Appln No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.
International Search Report and Written Opinion in International Appln No. PCT/US2022/022492, dated Jun. 28, 2022, 13 pages.
International Search Report and Written Opinion in International Appln No. PCT/US2022/022589, dated Jul. 7, 2022, 12 pages.
International Search Report and Written Opinion in International Appln No. PCT/US2022/022837, dated Aug. 2, 2022, 14 pages.
International Search Report and Written Opinion International Appln No. PCT/US2022/023831, dated Jul. 8, 2022, 13 pages.
Lee et al., "Design of Autonomous Underwater Vehicles for Cage Aquafarnns," IEEE Intelligent Vehicles Symposium, Jun. 13-15, 2007, pp. 938-943.
Maloy et al., "A spatio-temporal recurrent network for salmon feeding action recognition from underwater videos in aquaculture," Computers and Electronics in Agriculture, Nov. 12, 2019, 9 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv: 1902.10847v1, 12 pages.
Odey, "AquaMesh—Design and Implementation of Smart Wireless Mesh Sensor Networks for Aquaculture," American Journal of Networks and Communications, Jul. 2013, 8 pages.
Office Action issued in U.S. Appl. No. 15/346,281, mailed on May 1, 2018, 17 pages.
Petrov et al., "Overview of the application of computer vision technology in fish farming," E3S Web of Conferences, 2020, 175:02015.
Qiu et al., "Improving Transfer Learning and Squeeze-and-Excitation Networks for Small-Scale Fine- Grained Fish Image Classification," IEEE Access, Dec. 2018, 6(31):78503-78512.
Saberloon et al., "Application of Machine Vision Systems in Aquaculture with Emphasis on Fish: State-of-the-Art and Key Issues," Reviews in Aquaculture, Dec. 2017, 9:369-387.
Stein et al., "Consistent melanophore spot patterns allow long-term individual recognition of Atlantic salmon Salmo Salar," Journal of Fish Biology, Nov. 2017, 91(6): 1699-1712.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Wang, "Robust tracking of fish schools using CNN for head identification," Multimedia Tools and Applications, Nov. 2017, 20 pages.
www.aquafeed.com [online], "Self-propelled cage for fish farming," Aug. 20, 2008, retrieved Mar. 16, 2017, retrieved from Internet URL<http://www.aquafeed.com/read-article.php?id=2487&sectionid=1> 3 pages.
www.bizjournals.com [online], "Maine firm, partners make moveable fish farm for deep-ocean aquaculture," Aug. 14, 2008, retrieved on Mar. 17, 2017, retrieved from Internet URL<http://www.bizjournals.com/boston/blog/mass-high-tech/2008/08/maine-firm-partners-make-moveable-fish-farm.html> 2 pages.
www.fiskerforum.dk [online], "Self-Propelled cage tests," Nov. 20, 2008, retrieved on Mar. 16, 2017, retrieved from Internet URLhttp://www.fiskerforum.dk/en/news/b/Self-propelled-cage-tests> 5 page.
www.newscientist.com [online], "Mobile fish farms could soon navigate the oceans," Sep. 4, 2008, retrieved on Mar. 16, 2017, retrieved from Internet URL<https://www.newscientist.com/article/dn14663-mobile-fish-farms-could-soon-navigate-the-oceans/> 3 pages.
www.phys.org [online], "MIT tests self-propelled cage for fish farming," Sep. 3, 2008, retrieved on Mar. 16, 2017, retrieved from Internet URL<https://phys.org/news/2008-09-mit-self-propelled-cage-fish-farming.html> 2 pages.

(56) References Cited

OTHER PUBLICATIONS www.portofentry.com [online], "USA: Mit tests self-propelled cage for fish farming," Sep. 5, 2008, retrieved on Mar. 17, 2017, Retrieved from Internet URL<http://web.archive.org/web/20081119234732/http:/portofentry.com/site/root/resources/industry_news/6983.html> 2 pages.

www.seagrant.mit.edu [online], "Self-propelled Aquaculture Cage Debuts in Culebra," Jul. 15, 2008, retrieved on Apr. 16, 2021, Retrieved from Internet: URL<http://seagrant.mit.edu/press_releases.php?nwsID=54> 2 pages.

www.technovelgy.com [online], "Self-Propelled Underwater Fish Cages," Sep. 11, 2008, retrieved on Mar. 16, 2017, Retrieved from Internet URL<http://www.technovelgy.com/ct/Science-Fiction-News.asp?NewsNum=1871> 3 pages.

www.thefishsite.com [online], "Self-propelled Aquaculture Cage Debuts in Culebra," Jul. 31, 2008, retrieved on Mar. 17, 2017, Retrieved from Internet URL<http://www.thefishsite.com/fishnews/7571/selfpropelled-aquaculture-cage-debuts-in-culebra/> 3 pages.

www.thefishsite.com [online], "Self-Propelled Cage for Fish Farming Tested," Sep. 3, 2008, Mar. 17, 2017, Retrieved from Internet URL<http://www.thefishsite.com/fishnews/7808/selfpropelled-cage-for-fish-farming-tested/> 3 pages.

www.worldfishing.net [online], "Technology in waiting," Aug. 31, 2014, Mar. 17, 2017, Retrieved from Internet URL<http://www.worldfishing.net/news101/Comment/ben-yami/technology-in-waiting> 3 pages.

International Preliminary Report on Patentability in International Appln. No. PCT/US2022/022589, dated Oct. 26, 2023, 7 pages.

\* cited by examiner

CONTROL SYSTEMS FOR AUTONOMOUS AQUACULTURE STRUCTURES

CROSS REFERENCE TO RELATED APPLICATION

This patent application is a continuation (and claims the benefit of priority under 35 USC 120) of U.S. patent application Ser. No. 17/232,851, filed Apr. 16, 2021. The disclosure of the prior application is considered part of (and is incorporated by reference in) the disclosure of this application.

FIELD

This specification relates to control systems for aquaculture.

BACKGROUND

Aquaculture is a marine farming technique in which farms for marine life are placed offshore and/or in freshwater sources. One advantage of open ocean aquaculture is the dispersion of effluent produced by farms: near-shore aquaculture effluent settles below the farms on the seafloor, potentially damaging local ecosystems. Placing aquaculture in a large body of water may also ease the process of obtaining permits, mitigates issues around recreational use for near-shore space, and provides more space for the farms, allowing production to expand.

SUMMARY

Many aquaculture systems for growing and harvesting marine life are moored or anchored to the sea floor. These aquaculture systems, typically including a submersible cage structure containing marine life or a platform structure on which marine life grows, are subject to depth limitations and utilize robust moorings or anchors, as well as a human to travel out to the location of the farm to perform maintenance, feed and monitor the marine life, and eventually to harvest the marine life. For example, many seaweed production techniques rely on manual methods of cultivation, which are necessarily limited to near-shore waters where farms can be frequently accessed by humans. Furthermore, these farms are often static, where the growing seaweed can only be raised and lowered by hand, and only be a few meters at most to avoid over-drying of the seaweed during tidal fluctuations. Seaweed growth is dictated by the temperature and light and nutrients available in the immediate surface waters. These farms are subject to losses due to storm and wave action, undesirable nutrient conditions, competing algae species, and undesirable temperature fluctuations.

In some implementations, to effectively utilize the environment while ensuring proper care of the live cargo of the structure, a platform structure can be configured to autonomously navigate the ocean or body of water in which the farm structure, such as a seaweed structure or a cage, is submerged. By using a propulsion system to traverse currents, steer to certain locations, and adjust the depth of the platform on which marine life is growing, the proposed system provides a mobile aquaculture solution that reduces the need for humans to travel to the platforms or adjust the platforms for optimal growing conditions. In many areas of the oceans, surface waters are nutrient deplete; in addition to reducing labor requirements, the proposed system makes nutrients available to the cargo of the structure that is otherwise not accessible. The proposed system is not restricted to certain depths, and can raise and lower the platform and navigate to different locations based on a condition of the cargo growing on the structure.

An autonomous or semi-autonomous growth platform can be used to control farmed seaweed exposures to environmental parameters by changing depth in an offshore environment. Higher concentrations of nutrients and cooler water is available at greater depths, and because seaweed can perform luxury uptake, or more than a necessary amount, of macronutrients like nitrogen, farmed seaweed can be lowered at times to capture nutrients and raised at other times to capture sunlight for growth. For example, seaweed can be lowered at night to perform luxury uptake and raised during the daytime to capture sunlight.

The platform can be lowered during times of day when the sunlight reaches a particular level to prevent over-exposure. The raising and lowering of the platform can be performed autonomously to optimize a balance of light and nutrient uptake according to data collected by system sensors and control algorithms based on the collected data. A control system can tailor the depth to reduce parasite or epiphyte growth based on the differing nutrient and light requirements for different species of algae. For example, the platform can be lowered and kept at a depth that is darker than a threshold amount of light for an extended period of time to shed parasites or epiphytes, which may require more frequent exposure to light than the seaweed cargo does. The combination of nutrient load and photoperiod can control protein and other constituent levels, therefore seaweed could be tailored to produce particular compounds of value. Additionally, dynamic vertical positioning allows the platform to avoid conditions such as storms and large waves, the forces of which are mitigated at depth; the avoidance of ships and other entanglement hazards; and dynamically assisting in harvesting efforts. The autonomous navigation aspect of the structure allows for cargo to be grown in open ocean regions that are more nutrient-rich, or have different nutrients available than near-shore regions.

The structure can autonomously navigate and adjust the positioning of the platform on which the live cargo is supported, and can be used to optimize specific parameters, including the chemical content of a particular set of cargo. For example, a structure that supports seaweed being grown for consumption can be given instructions to navigate within the open ocean to achieve particular compositions of seaweed content, such as a particular level of protein or chemical. The marine life supported by the structure can be used for various purposes, including fuel, food, feed, and pharmaceutical applications, among other purposes.

The addition of marine life to the open ocean and, in particular, of algae such as seaweed can de-acidify and lower the local temperature of the ocean and perform filtration and sanitation functions. A certain amount of grazing from the marine life cargo can occur, improving the nutritional content available to the existing ecosystem. Furthermore, algae supported by the structure can serve as an anchor to the existing ecosystem.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
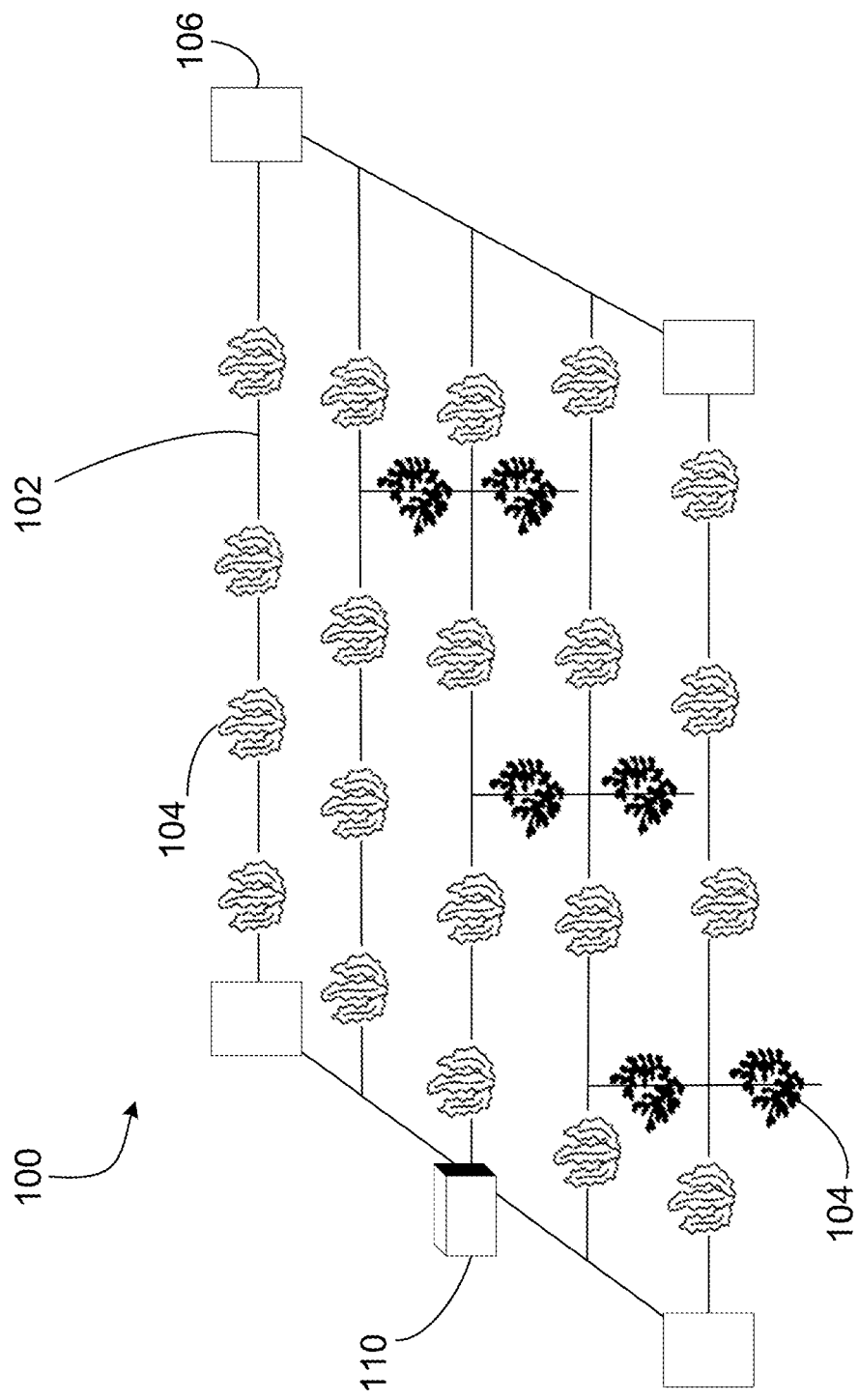
FIG. 1 is a diagram of an example configuration of an autonomous submersible structure that supports live aquatic cargo.

FIG. 1 is a diagram of an example configuration of an autonomous submersible structure 100 that supports live aquatic cargo. In this example, the structure 100 is a platform that supports live marine life by providing optimal growth conditions and physical support. The structure 100 is configured to navigate, untethered, in a body of water and to maintain predetermined conditions for the cargo contained within the structure 100 itself. In this particular example, the structure 100 is configured to navigate the open ocean and to maintain optimal conditions for the live marine life by raising and lowering itself within the ocean. The structure 100 supports seaweed cultivation of various species, where seaweed is attached to the structure 100 in various forms.

The structure 100 includes a platform 102, cargo 104, a support structure 106, a controller 110, and a propulsion system 120.

The structure 100 is a free-floating structure located in a body of water and is configured to autonomously navigate and control its depth to optimize growth conditions for the cargo 104. In some implementations, the structure 100 can be tethered or moored to a stationary structure, such as a dock, a buoy, or the ocean floor, among other structures. The structure 100 includes the platform 102 and the support structure 106 for containing cargo 104.

The cargo 104 can be algae or other aquatic lifeforms. In this particular example, the cargo 104 is macroalgae, or seaweed, and can be red, brown, or green seaweed. In some implementations, the cargo 104 is in the spore stage of growth, and the length of time the structure 100 autonomously navigates is the length of time required for the cargo 104 to be ready for harvesting.

The platform 102 can include support structures 106 on which the cargo 104 grows. The platform 102 can be tailored to the type of the cargo 104 that it supports. For example, the platform 102 can include the support structures 106 tailored to the species of seaweed that is growing on the platform 102. The support structure 106 can be made of poles embedded in sediment, floating buoys, cables, ropes, nets, inflatable structures, and rigid frames, among other types of materials. For example, the support structures 106 can be made of material that is seeded with nutrients selected for a particular species of the cargo 104 or a desired resulting composition of the cargo 104, as described in further detail with respect to FIG. 2.

In some implementations, the support structures 106 span the platform 102. In some implementations, the support structure 106 hangs from the platform 102 or other support structures 106. In this particular example, the support structures 106 span the platform 102 and hang from the platform 102. Structures 100 can have a mixture of multiple configurations of the support structures 106.

In some implementations, the platform 102 and the support structures 106 can collapse into more hydrodynamic configurations. For example, the controller 110 can detect an area of increased resistance and control the platform 102 and the support structures 106 to collapse into a structure with lower drag.

In some implementations, the cargo 104 can be finmarine life or other aquatic lifeforms. For example, the cargo 104 can be juvenile marine life, and the length of time the structure 100 is travelling between the starting point and the destination is the length of time required for the cargo 104 to reach maturity. In some implementations, the cargo 104 can be other resources, such as fresh water, relief aid, etc. In some implementations, the cargo 104 can be shellfish or another type of marine life. The structure 100 can support integrated multi-trophic aquaculture (IMTA) systems, which can include multiple, different types of marine life.

Multiple structures 100 can be co-located within a predetermined distance of each other. The structures 100 can be co-located such that different types of the cargo 104 can provide symbiotic benefits to each other. For example, a structure containing shellfish and a structure containing seaweed can be optimally co-located such that the seaweed and shellfish have a symbiotic relationship and each species' presence benefits the other.

In some implementations, the platform 102 has a skeleton covered by a mesh netting. The mesh netting covering the skeleton of the platform 102 can have holes sized based on the cargo 104 contained within the platform 102. For example, if the average size of a homogenous cargo 104 is 12 cm in diameter, the holes of the mesh netting can be 10 cm in diameter to prevent the cargo 104 from exiting the platform 102. In some implementations, the mesh netting covering the skeleton of the platform 102 is made from material that can withstand strong currents, such as iron, steel, etc. In some implementations, the platform 102 does not include mesh netting, and is environmentally sealed to protect the cargo 104 from water.

In some implementations, the platform 102 encompasses a volume of 3,600 $ft^3$. For example, the platform 102 can have a diameter between fifty and seventy feet. In some implementations, the platform 102 has a diameter of 63.66 feet. In some implementations, the platform 102 encompasses a different volume, such as 2,500 $ft^3$, 4,000 $ft^3$, 6,000 $ft^3$, etc., and can have a different diameter, such as twenty feet, forty feet, sixty feet, etc.

The location and position of structure 100 is controlled by propulsion system 120. The propulsion system 120 can include altitude control equipment that allows the platform 102 to move up and down within the water. The platform 102 can move vertically within a water column, or with some velocity in other directions. For example, the platform 102 can move down and in a direction 5° counterclockwise from its starting position. In some implementations, the propulsion system 120 allows the platform 102 to move entirely out of the water, facilitating activities such as harvesting.

The propulsion system 120 can use systems of cables and winches or buoyancy engines, among other systems. The propulsion system 120 can be powered by indirect and/or direct current energy harvesting through an integrated power distribution system or a separate power distribution system. For example, the propulsion system 120 can be powered by solar panels that are directly integrated with the propulsion system 120. The propulsion system 120 can be powered by a power distribution system such as a battery pack. In some implementations, the propulsion system 120 can be powered by a wired connection to an on-shore power system.

In some implementations, the propulsion system 120 includes a sail attached to a mast, boom, or other spar that is attached to the structure 100 and provides propulsive force to the structure 100 that allows it to move within a body of water.

Because the structure 100 can move vertically, the yield of the cargo 104 can be optimized for light and nutrient exposure. This optimization of growth parameters can increase the biomass productivity of the cargo 104. For example, the platform 102 can be raised in times of optimal levels of sun and lowered at night for uptake of nutrients within the water such as nitrogen. In some implementations, the uptake of nutrients can be excess, or luxury, uptake. The automated optimization and balance of various growth factors allows for greater control over the biomass yield of the cargo 104.

In some implementations, the propulsion system 120 includes a set of propellers located on the back of the cage. In some implementations, the propellers are two offset propellers which allow the structure 100 to be steered, as well as change depth. In some implementations, the propellers each have a large diameter relative to the size of the platform 102. For example, the propellers can each have a diameter between 2-10% of the diameter of the platform 102. In some implementations, the propellers each have a diameter between two meters and four meters. In some implementations, the propellers each have a diameter of 3.25 meters.

In some implementations, the propellers have a low rotational velocity relative to typical rotational velocities used by propellers for submersible structures. For example, the propellers can each have a rotational velocity between ten and fifty RPM. For example, the propellers can each have a rotational velocity of thirty RPM. In some implementations, the propellers can each have a different rotational velocity, such as sixty RPM, seventy-five RPM, etc.

By using propellers with large diameters relative to the size of the platform 102 and with low rotational velocities relative to typical rotational velocities, the propulsion system of the structure 100 is more efficient than current propulsion systems on submersible structures. For example, the propulsion system of the structure 100 can be 90% efficient. The high efficiency of the propulsion system 120 reduces the need for power, and allows the structure 100 to use smaller generators. Generators can include electrical generators that convert energy into electricity, such as engine generators, generators that use solar power, and engines that convert mechanical energy into electricity. The reduction in power needed reduces the strain on a power generation system that powers structure 100.

In some implementations, the propellers have the same diameter and the same rotational velocity. In some implementations, the propellers can each have different diameters or different rotational velocities. In some implementations, the propulsion system 120 can include fins that operate like fish fins, by flapping and/or acting as a rudder.

The structure 100 can include an environmentally sealed, raised protrusion that houses sensitive components of the structure 100. In some implementations, the protrusion houses the controller 110 and sensors and communications systems. The controller 110 and the sensors and communications systems can include sensors and electronics sensitive to water damage, and must be kept dry to function. The systems needed to steer the structure 100 and control the propulsion system 120 can include sensitive electronic components.

In some implementations, the cargo 104 is live and requires feed that must be kept dry. The raised protrusion can include a feeding mechanism that contains and dispenses feed for the cargo 104.

In some implementations, environmentally sealing the entirety of the protrusion for the length of the journey taken by the structure 100 is not possible. In some implementations, a portion of the protrusion containing the most sensitive electronic components, as well as the feed is kept above water at all times.

The controller 110 is a decision system for the structure 100 that directs the vertical motion and positioning of the structure 100 in response to inputs such as parameters of the seaweed 104 and parameters of the water in which the structure 100 is navigating. The controller 110 can control the depth of the structure 100 within a water column, the speed of the structure 100 within a body of water, and the ascent and/or descent of the structure 100 within a body of water, among other movements of the structure 100. The controller 110 can control the motion and positioning of the structure 100 by generating control signals for the propulsion system 120. For example, the controller 110 can generate control signals for the propulsion system 120 that cause a system of cables and winches to raise and lower the structure 100 within a column of water.

Parameters of the seaweed 104 includes health parameters, such as the biomass of the seaweed 104, the color of the seaweed 104, the overall health of the seaweed 104, etc. For example, the controller 110 can receive, as input several parameters including the chemical profile of the seaweed 104 and determine the overall health of the seaweed 104. Operation of the controller 110 is described in further detail with respect to FIG. 3.

The controller 110 controls the propulsion system 120 to steer the structure 100. The controller 110 is communicatively coupled to the propulsion system 120. In some implementations, the controller 110 is coupled to the propulsion system 120 through communication buses within environmentally sealed conduits. In some implementations, the controller 110 transmits control signals to the propulsion system 120 wirelessly through various wireless communications methods, such as RF, sonic transmission, electromagnetic induction, etc.

The controller 110 can control the movement of the structure 100 without requiring large amounts of power by navigating ocean currents. Ocean currents flow regionally in complex eddies and gyres that combine or divide into distinct directions, or forks. These forks can flow in different directions. The position of the structure 100 within a particular ocean flow determines the direction in which the structure 100 moves at a fork. The controller 110 can predict the path of these currents ahead of time and traversing the currents by analyzing sensor data and generating control signals to control the movement of the structure 100. By traversing ocean currents, the structure 100 can use passive power to travel. For example, the structure 100 can travel large distances and to many locations simply by making small movements at forks in ocean currents and floating along with the currents.

The controller 110 can use side-scan sonar, lidar, and optical methods of sensing to measure overall growth of the cargo 104. The sensors and communications system can utilize various types of sensors, including single spectrum sonar and multiple spectra sonar. The controller 110 can use multiple angles of sonar readings, multiple images, etc. to, for example, reconstruct three-dimensional images of the seaweed cargo 104. The controller 110 can, for example, use machine learning to analyze side-scan sonar data for calculating the biomass of the cargo 104. The controller 110 can calibrate the data gathered by the sensors for the particular type of sensor or the environmental conditions. For example, if the water clarity has not reached a particular threshold level, the controller 110 can rely more heavily on sonar data than lidar data. The controller 110 can calibrate the data specifically for the cargo 104. For example, the side-scan sonar can use multiple spectra to determine the biomass of the particular type of the cargo 104 and determine health parameters such as the overall health of a particular type of the cargo 104, the concentration of a particular protein within the cargo 104, etc.

The controller 110 can use health parameters of the cargo 104 to determine the overall health of the cargo 104. For example, the controller 110 can receive parameters such as protein concentration, carbohydrate levels, and chlorophyll levels, among other parameters. The controller 110 can use the health parameters to sense the growth of the cargo 104 and determine control signals to navigate the platform 102. For example, based on determining, from sensor data, that the biomass of the cargo 104 has reached a threshold level, the controller 110 can generate control signals to navigate the platform 102 to shore for harvesting.

In some implementations, the controller 110 can receive feedback from the propulsion system 120. For example, the controller 110 can receive the resistance met by a winch as the platform 102 is raised by the propulsion system 120. The controller 110 can use the feedback from the propulsion system 120 to adjust subsequent control signals to the propulsion system 120.

The controller 110 can determine a path through the body of water in which the structure 100 is submerged and corresponding control signals for the propulsion system 120 locally. In some implementations, the controller 110 is communicatively coupled to sensors and a communications system, and uses data collected by the sensors and communications system to navigate. In some implementations, the controller 110 is coupled to the sensors and communications system through communication buses within environmentally sealed conduits. In some implementations, the controller 110 receives sensor data from the sensors and communications system wirelessly through various wireless communications methods, such as RF, sonic transmission, electromagnetic induction, etc.

In some implementations, the controller 110 communicates with a remote server through the sensors and communications system to receive new bearings. For example, the sensors and communications system can transmit position data of the structure 100 to a remote server, which processes the data and transmits a new bearing to the controller 110. The controller 110 can receive the new bearing, process the data, and generate updated control signals for the propulsion system 120. In some implementations, the controller 110 communicates with a remote server through the sensors and communications system to receive new control signals for the propulsion system 120.

In some implementations, the controller 110 can generate updated control signals for the propulsion system 120 locally, without communicating with a remote server. For example, the controller 110 can receive data from the sensors and communications system, process the data to determine a new bearing, and generate updated control signals for the propulsion system 120. In some implementations, the controller 110 can provide navigation signals to the structure 100 without the use of GPS. For example, the controller 110 can navigate the structure 100 using positioning data collected by the sensors and communications system.

The sensors and communications system collects data and transmits the data to the controller 110. The sensors and communications system monitors local water parameters, such as water temperature, light availability, nutrient levels (e.g., of nitrate), chlorophyll A levels, salinity, pressure, etc. For example, the sensors and communications system can include a nitrate sensor that detects and records the level of nitrate available in the water. The sensors and communications system can include sensor arrays and transducers for receiving and transmitting underwater signals for positioning in the body of water in which the structure 100 is submerged and/or communicating between structures 100 and/or with a separate sea vessel, such as a maintenance boat. For example, the sensors and communications system can include sonar sensor arrays that detect the position of the structure 100 in the body of water in which the structure 100 is submerged.

The sensors and communications system can be integrated with the structure 100 such that the sensors and communications system is contained within a protrusion from the platform 102.

The communications systems include networks over which data regarding farm conditions, water quality, etc. The communications system can be a wired connection or a wireless connection. For example, the communications system can be implemented over a wireless network such as a cellular or satellite network to share water quality data with other farms. The communications system allows the structure 100 to communicate with systems such as other farms and/or central control centers that monitor and forecast weather and conditions at a farm-level.

The sensors and communications system can include vision sensors, such as sonar, cameras, etc. that detect objects or acquire images for image analysis by the sensors and communications system or a remote server. For example, the sensors and communications system can include a camera that monitors the activity of the cargo 104. The controller 110 can use various techniques to analyze image data collected, including image recognition processes that utilize machine learning, as described in further detail below with respect to FIG. 3.

In some implementations, the sensors and communications system can detect objects near the structure 100. For example, the sensors and communications system can use a sonar sensor array to detect objects on the floor of the body of water in which the structure 100 is submerged. In some implementations, the sensors and communications system can detect currents near the structure 100. For example, the sensors and communications system can use water temperature and pressure data to determine the boundaries of a current.

In some implementations, the sensors and communications system can detect predators near the structure 100. For example, the sensors and communications system can provide data to the controller 110 indicating that predators are preying on the seaweed cargo 104. The controller 110 can then generate control signals for the propulsion system 120 to navigate the body of water in order to evade or avoid predators.

In some implementations, the controller 110 can map out features of the body of water in which the structure 100 is submerged and its floor using information from the sensors and communications system. For example, the sensors and communications system can use sonar to detect underwater mountains, canyons, etc. and transmit the data to a remote server. The sensors and communications system can communicate with a remote server through various wireless methods, such as RF, sonic transmission, electromagnetic induction, etc. The controller 110 can use information from the sensors and communications system to map out nutrient-deplete regions and to determine the internal ocean nutrient cycling regions. For example, the controller 110 can analyze data from the sensors and communications system to identify the boundaries and time frame of an ocean region's nutrient cycle.

The controller 110 can use the data collected by the sensors and communications system to traverse the body of water in which the structure 100 is submerged. For example, the controller 110 can receive data from the sensors and communications system indicating that the structure 100 is currently caught in a fast-moving current, but that the boundary between the current and calm water is 5 m below the center of the structure 100's current position. In this example, the controller 110 can generate control signals for the propulsion system 120 to sink the structure 100 below the boundary of the fast-moving current. The controller 110 can steer the structure 100 into or out of currents, based on the desired path of the structure 100. In some implementations, the controller 110 can use the data collected by the sensors and communication system to sense currents above or below the current position of the structure 100 as well. For example, the controller 110 can use side-scan sonar to detect an underwater current underneath the current position of the platform 102. The controller 110 can use the data collected by the sensors and communications system to identify regional river effluences that are, for example, tens of kilometers offshore and can identify polluted regions. The controller 110 can then control the propulsion system 120 to navigate the structure 100 away from polluted or otherwise harmful regions.

The controller 110 can control the propulsion system 120 to keep the structure 100 geostationary. For example, in a storm, or other situations in which navigating conditions are suboptimal, the controller 110 can receive feedback from the propulsion system 120 and the sensors and communications system to maintain a position in which the structure is to remain.

The controller 110 can control the propulsion system 120 to change a course of the structure 100. For example, if the structure 100 is called into a docking station for maintenance, the controller 110 can receive the coordinates of the docking station and can generate control signals for the propulsion system 120 to change course for the docking station.

The controller 110 controls the propulsion system 120 to steer the structure 100 based on a condition of the cargo 104. The controller 110 can steer the structure 100 based on sensor data received from the sensors and communications system to maintain optimal water quality for the cargo 104. For example, the controller 110 can steer the structure 100 to maintain optimal temperature, salinity, and pH for the cargo 104, which, in this example, is seaweed. In some implementations, the controller 110 can control the propulsion system 120 to steer the structure 100 based on a dispersion rate of effluent, e.g., liquid waste or sewage, produced by the cargo 104. For example, the sensors and communications system can determine a dispersion rate of effluent using a vision system and transmit the data to the controller 110, which determines a course and velocity for the structure 100 based on the data received.

A feeding mechanism can contain and dispense feed for the cargo 104. In this particular example, the cargo 104, and the feed can include micronutrients that are not available, or available in insufficient levels, in a body of water in which the structure 100 is navigating. The feed is selected based on the cargo 104. In some implementations, the feed must be kept dry. In some implementations, the feed bin is pressurized with dry air to keep the feed dry. The feeding mechanism is communicatively coupled to the sensors and communications system, and uses data collected by the sensors and communications system to determine feeding parameters. In some implementations, the feeding mechanism is coupled to the sensors and communications system through communication buses within environmentally sealed conduits. In some implementations, the feeding mechanism receives sensor data from the sensors and communications system wirelessly through various wireless communications methods, such as RF, sonic transmission, electromagnetic induction, etc.

The feeding mechanism automatically dispenses the feed. In some implementations, the feed is dispensed based on a rate that the feed falls through the water. For example, the feeding mechanism can receive water quality data and position, velocity, and directional data from the sensors and communications system. The feeding mechanism can use the water quality data to determine the rate at which the feed is released. In some implementations, the feeding mechanism dispenses the feed based on a feed rate for optimal growth or maintenance of the cargo 104. For example, the feeding mechanism can dispense the feed based on data from the sensors and communications system indicating an optimal rate for growth of the seaweed cargo 104.

A power generation system can provide power for each of the controller 110, the propulsion system 120, the sensors and communications system, and the feeding mechanism.

The power generation system can include generators. In some implementations, the power generation system can use a heat sink engine, using cold water driven to deeper depths for driving its heat exchange. In some implementations, the power generation system can use ocean thermal energy conversion (OTEC) to generate electric power for the various systems of the structure 100. In some implementations, the power generation system can use a solar power system, such as solar panels, to generate electric power for the various systems of the structure 100. In some implementations, the power generation system uses other renewable energy systems, such as wind, harvesting energy from the waves and currents, etc. In some implementations, the power generation system can use generators powered by resources such as natural gas. In some implementations, the power generation system can be recharged when the structure 100 is serviced, or when maintenance is performed on the structure 100.

The power generation system can utilize direct wind power through a system of sails and keels. The power generation system can utilize one or more wind turbines alone, or in combination with power storage systems such as batteries. The power generation system can utilize a sea anchor that is raised or lowered with a winch to capture currents at different depths that may flow in directions different than at the surface. The power generation system can utilize wave energy through direct electricity generation. For example, the power generation system can be integrated with the propulsion system 120 and directly power propellers through wave energy electricity generation. The power generation system can utilize wave energy through subsurface gliders.

The structure 100 can include a component that provides stability to the structure 100, preventing the structure 100 from keeling over. For example, the structure 100 can include a ballast that remains below water level and counteracts the effects of weight of the structure 100 above water level. In some implementations, the protrusion containing controller 110 and other sensitive components can be heavy component relative to the rest of the structure 100. Without compensation for the weight of the protrusion that is above water level, the structure 100 can capsize. In some implementations, the ballast is selected based on the weight of the protrusion and the portion of the protrusion that must be kept above water level.

The ballast can be placed at the bottom of the structure 100 and attached to the platform 102. In some implementations, the ballast is a single weight. In some implementations, the ballast can be a compartment of the platform 102, and the weight of the ballast can be adjusted by adding more material to the compartment. The ballast can be made from heavy material, such as gravel, sand, iron, or other various materials typically used as weights.

In some implementations, the structure 100 can include an anchor that provides tension such that when the structure 100 navigates within a body of water, force is applied to the platform 102 such that the structure on which the cargo 104 is growing remains taut.

Figure 2:
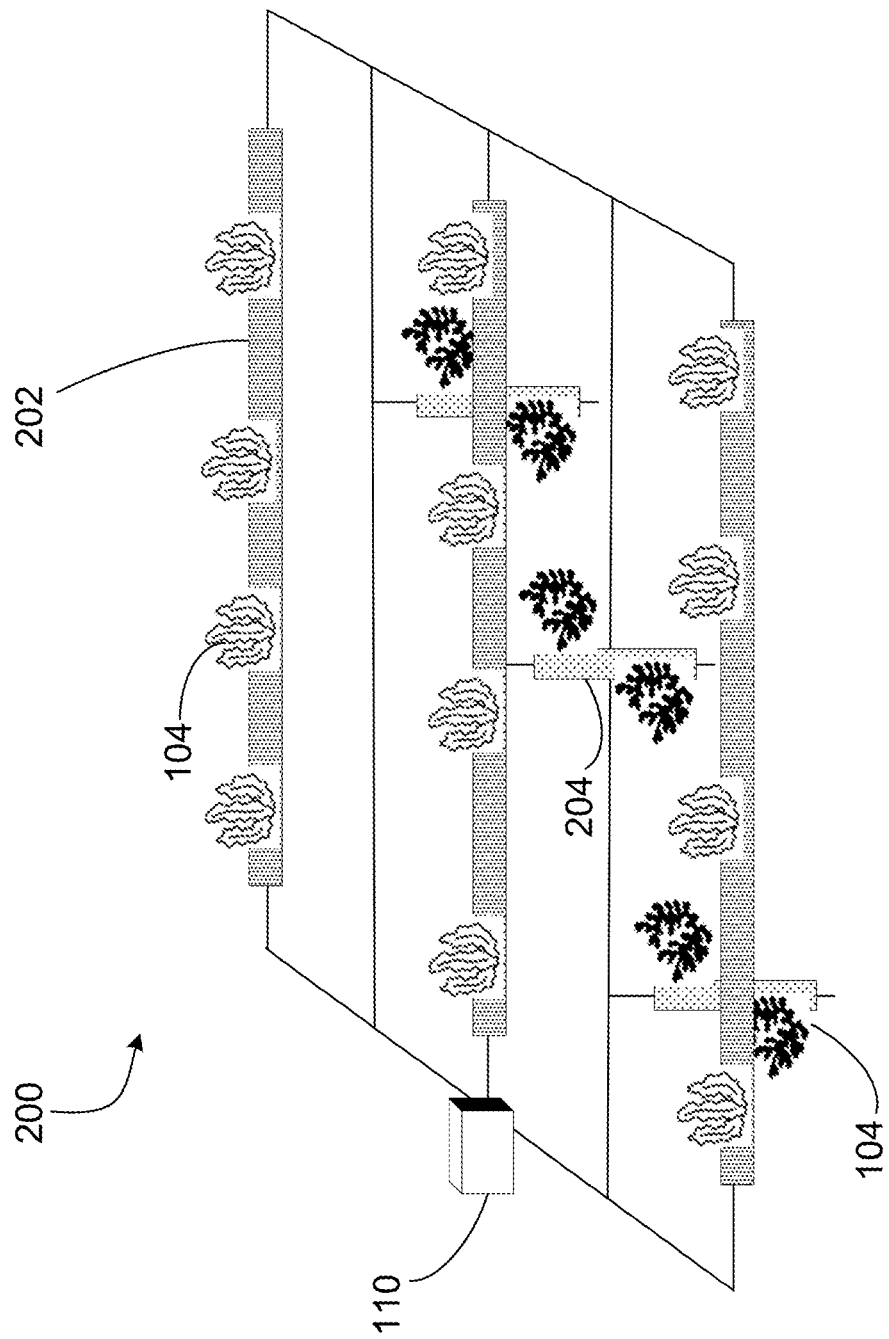
FIG. 2 is a diagram of an example configuration of a growth system integrated with an autonomous submersible structure that supports live aquatic cargo.

FIG. 2 is a diagram of an example configuration of a growth system 200 integrated with an autonomous submersible structure that supports live aquatic cargo.

Photosynthetic organisms may not thrive in many macronutrient-rich regions in the oceans because key micronutrient levels are low. This lack of micronutrients can limit the growth potential of the organisms, and thus limit the available supply of sustainably grown food, such as the seaweed cargo 104. The seaweed cargo 104 can be grown in more areas of the ocean if these key micronutrients are made available.

The growth system 200 allows various macronutrient-rich regions that are currently not utilized for growing the seaweed cargo 104 to support various cultivated seaweed species by providing key micronutrients directly on growth substrates of the cultivated seaweed growing platforms 102 that support the seaweed cargo 104. The growth system 200 allows growing the cargo 104 in currently un- or underutilized regions of the open ocean, and are not constrained in the way that anchored and/or near-shore systems are constrained. Additionally, the growth system 200 supports the growth of marine life in large systems that are unconstrained by coastal bathymetry.

The growth system 200 includes a platform 102, a controller 110, and support structures with growth substrate 202 and 204. Support structures with growth substrate 202, 204 can be an embodiment of the support structure 106 as shown in FIG. 1 within structure 100.

The support structures with growth substrate 204, 204 are fertilized substrates that are a source of key micronutrients to the cargo 104. The support structures with growth substrate 202, 204 can supplement, or act as an alternative to, the depth cycling of the structure 100 as controlled by the controller 110. The micronutrients with which the support structures with growth substrate 202, 204 are seeded include key nutrients that are required for a desired growth of the cargo 104, and that are deplete or exist in insufficient levels within the body of water in which the structure 100 is navigating.

The micronutrients provided by the support structures with growth substrate 202, 204 can be tailored to the particular regions in which the structure 100 is navigating. The micronutrients can include iron, zinc, manganese, etc. For example, if the particular area of the body of water in which the structure 100 is navigating is deplete in iron, the support structures with growth substrates 202, 204 can provide iron within the growth substrates. In some implementations, the support structures with growth substrate 202, 204 can provide macronutrients that are unavailable.

The growth system 200 can include bacteria or other organisms that facilitate the growth of the cargo 104. For example, the support structures with growth substrates 202, 204 can include nitrogen-fixing bacteria such as atelocyanobacterium thalassa (UCYN-A), a single-celled cyanobacteria. Such organisms can provide nutrients such as nitrogen, and can facilitate the growth of the cargo 104 in regions that are nitrogen-limited or deplete of nitrogen. However, organisms such as UCYN-A require a certain amount of micronutrients. In some implementations, the growth system 200 can provide these micronutrients to the cargo 104 and these additional organisms. The additional organisms then release nutrients such as nitrogen to the cargo 104. These symbiotic relationships can be fostered through the growth system 200, which can include such bacteria or other organisms as components of the support structures with growth substrates 202, 204. In some implementations, the bacteria can be integrated with the substrates or the cargo 104 itself. For example, the UCYN-A can be infused into the micronutrient coatings of the support structures with growth substrates 202, 204, or attached directly to the seaweed cargo 104.

The support structures with growth substrate 202, 204 can provide nutrients through different mechanisms. The support structures with growth substrate 202, 204 can provide nutrients through passive and/or active mechanisms.

In this particular example, the support structures with growth substrate 202, 204 are fertilized and/or infused with the nutrients. In some implementations, the nutrients to be provided to the cargo 104 can be deposited as coatings on the substrate of the support structures with growth substrate 202, 204. The coating can slowly dissolve off of the support structures with growth substrate 202, 204, and provide neighboring waters with nutrients in addition to providing the seaweed cargo 104 with the nutrients. For example, nutrients such as $FeSO_4\ 7H_2O$ could be coated in thin layers on the support structures with growth substrate 202, 204 such as coatings of around 3 mm thick. In some implementations, the support structures with growth substrate 202, 204 can release the nutrients from a system similar to that of the feeding system as described above with respect to FIG. 1.

The nutrients provided through the support structures with growth substrate 202, 204 can provide sufficient bioavailable nutrients over a predetermined period of growth such that the provided nutrient is not the limiting factor, even in situations when the nutrient dispersion system is not optimally efficient. In some implementations, binding agents are needed to keep the nutrient coatings and/or infusions on the support structures with growth substrate 202, 204 flexible and to keep the nutrients from breaking off of the substrate in the dynamic ocean environment. In some implementations, adhesion agents may be used to keep the coatings attached to the substrate.

The nutrient coatings on the support structures with growth substrate 202, 204 can passively dissolve in the water. In some implementations, the nutrient coatings dissolve in areas of low nutrient density. In some implementations, the nutrient coatings dissolution can be pH driven or ion diffusion gradient driven. In some implementations, the support structures with growth substrate 202, 204 can include a membrane separating the nutrients from seawater. For example, the support structures with growth substrate 202, 204 can include a thin coating around the nutrients.

The support structures and growth substrate 202, 204 can include a plurality of micronutrient mixtures that make up the overall coating or nutrient fluid. In some implementations, the support structures and growth substrate 202, 204 have a plurality of concentric coatings of different nutrients. For example, the support structures and growth substrate 202, 204 can have concentric coatings of iron and zinc, similar to coaxial cables. The concentric coatings can have various and timed release functions, such that the coating on the outside diffuses and is released first, and a coating inside diffuses and is released second.

The various nutrients and nutrient layers become active in different conditions or times. In some implementations, the controller 110 can generate control signals that cause the dispersion of particular nutrients. For example, the nutrient layers can be dispensed when the water temperature has dropped below a threshold temperature. A particular nutrient can be dispensed when the pH of the water has reached a predetermined threshold level, when a particular condition is detected through sensor data, when a particular set of conditions has occurred, etc. For example, a particular nutrient can be dispensed when the controller 110 has detected, through a combination of different sensor data, that the spring season has begun.

In some implementations, the support structures with growth substrate 202, 204 also secure the seaweed cargo 104 to the platform 102 through attachment points. These attachment points, or holdfasts, can be directly attached to the substrates with the coatings around them or on the outside of the coatings where they grow tighter onto the substrate as the nutrients dissolve over time.

The nutrients provided by the growth system 200 must be physically supported by the structure 100. The overall mass requirements of the nutrients and the cargo 104 at its desired growth stage are accounted for in the design of the structure 100, and can be fully supported by the platform 102. For example, if the growth system 200 distributes 100 lb of iron over the course of 5 weeks, and the seaweed cargo 104 is expected to reach a biomass of 500 lb, the platform 102 can be designed such that it can support the total initial weight of the 100 lb of iron and the initial weight of the seaweed cargo 104, as well as an end weight of the seaweed cargo 104. In some implementations, the platform 102 can physically support the overall mass requirements underwater and above the water in situations such as harvesting.

The support structures with growth substrate 202, 204 can actively distribute the nutrients to the cargo 104. The active distribution of the nutrients to the cargo 104 can be controlled by the controller 110. For example, the controller 110 can generate control signals to cause the support structures with growth substrate 202, 204 to actively discharge the nutrients through a physical device, such as a distribution tube with a pump. The pump can be driven with liquid or gas. In some implementations, a distribution tube can be integrated into the support structures with growth substrate 202, 204. In some implementations, a distribution tube can be separate from the support structures with growth substrate 202, 204 can attached, for example, alongside the substrate. The distribution tube can include features that allow the nutrients to escape into the environment in which the platform 102 is navigating. For example, the distribution tube can include outlet holes or other features that allow a nutrient-rich fluid to escape from within the distribution tube into the environment to be absorbed by the cargo 104.

In some implementations, the support structures with growth substrate 202, 204 can force passive coatings to diffuse into the water. For example, the controller 110 can produce an electrical charge similar to electrophoresis through the support structures with growth substrate 202, 204 to force the passive coatings to diffuse. The electrical charge allows for controlled and timed additions to the water.

As described above with respect to FIG. 1, the controller 110 can receive sensor data. The controller 110 can use the received sensor data to determine available levels of nutrients, the current stage in the growth cycle of the cargo 104, the presence of competing microalgae, etc. The controller 110 can use the sensor information as feedback to inform future decisions, and as input to its algorithms to determine control signals for the distribution of the nutrients in addition to the navigation of the platform 102. The controller 110 can use sensor data to monitor values such as permeation rates, nutrient levels, biomass of the cargo 104, etc. and as feedback to generate subsequent control signals to control the navigation of the platform 102 and/or the distribution of the nutrients.

In some implementations, the support structures with growth substrate 202, 204 include an agitator that keeps water flow across the coatings higher. The support structures with growth substrate 202, 204 can include an agitator that keeps water flow across the cargo high. This can increase nutrient uptake rates when, for example, the boundary layer of water around cargo such as seaweed is broken down. The agitator can be wave or electrically powered, and is controlled by the controller 110. The support structures with growth substrate 202, 204 can increase the diffusion rate of the nutrients into the water. The controller 110 can use sensor feedback from the agitator and the water flow rate to generate control signals for platform 102.

The controller 110 can use data collected by the sensors and communications system to dynamically alter the structure 100. The platform 102 can be dynamically altered based on factors including health parameters of the cargo 104 and detected environmental conditions. For example, the controller 110 can determine, based on data collected by the sensors and communications system, that the cargo 104 is too densely packed, and that the cargo 104 would have better growth potential if given more space. The controller 110 can then dynamically alter the platform 102 by changing the positioning of the support structures 106. For example, the controller 110 can control the propulsion system to change the spacing between each of the ropes of the support structures 106.

In some implementations, the controller 110 can determine the optimal spacing density for the cargo 104, and can automatically adjust the positions of the support structures 106 based on current environmental conditions and health conditions of the cargo 104. For example, the controller 110 can alter the spacing density of the seaweed cargo 104 to optimize for nutrient absorption based on the species of the seaweed cargo 104 and the environmental conditions.

Figure 3:
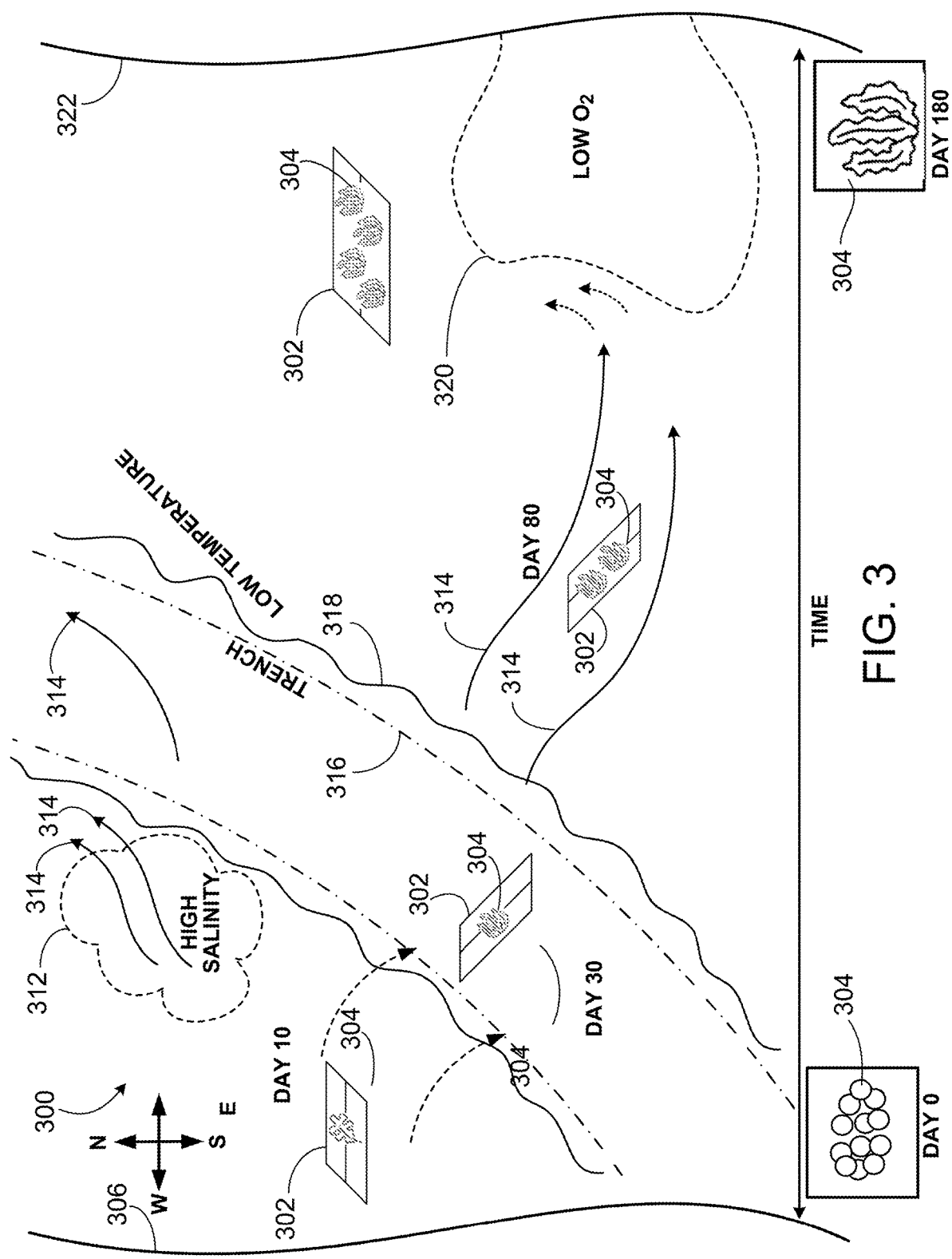
FIG. 3 is a diagram of an example process of the navigation of an autonomous submersible structure that supports live aquatic cargo.

FIG. 3 is a diagram of an example process 300 of the navigation of an autonomous submersible structure that contains live aquatic cargo. In this example, the structure 302 is an off-shore platform that contains seaweed 304. The structure 302 can be an embodiment of the structure 100 described with respect to FIGS. 1-2. The seaweed 304 can be an embodiment of the cargo 104 described with respect to FIGS. 1-2.

The process 300 begins on day 0. The seaweed 304 can be in an early stage of development. In this example, the seaweed 304 is attached to the structure 302 at a starting location 306. For example, the seaweed 304 can be attached to the structure 304 as sporified seedlings, seaweed fragments, etc., depending on the species of seaweed. The starting location 306 can be a natural habitat of the seaweed 304, a farming location, etc. For example, the seaweed 304 can be harvested from a region 306 and attached to the structure 302.

In some examples, the seaweed 304 is to be delivered to a destination location 322. For example, the seaweed 304 can be deposited into the structure 302 at the starting location 306 at an early stage of development and can be delivered by the structure 302 to the destination location 322 at harvesting maturity. In some examples, the destination location 322 is different from the starting location 306. For example, the seaweed 304 can be delivered from North America to a location in Europe. In some examples, the destination location 322 is the same as the starting location 306. The seaweed 304 can be sent into a body of water to mature and can be delivered back to the starting location 306 for harvest. For example, the structure 302 can be controlled to drift in the open ocean based on certain parameters.

The seaweed cargo 304 can be annual seaweed or perennial seaweed. In some implementations, the seaweed cargo 304 can be perennial seaweed that can be harvested by trimming some, but not all of the seaweed 304. The structure 302 can be controlled to arrive at the destination location 322 for harvesting/trimming based on a growing schedule.

As the structure 302 drifts in the body of water in which it is submerged, a control system of the structure 302 can control a propulsion system of the structure 302. The propulsion system of the structure 302 can include a system of winches, cables, sails, etc. as described with respect to FIGS. 1-2. The propulsion system of the structure 302 can control the direction of travel, of the structure 302, the depth of the structure 302, etc. For example, the propulsion system can be controlled to navigate the structure 302 around obstacles, undesirable areas of water, etc.

The control system can receive data readings from sensors associated with the structure 302. In some examples, these data readings are received in real-time. In some examples, the sensors are an embodiment of the sensors described with respect to FIGS. 1-2. The data can include readings of environmental parameters, such as the location of the structure 302, the water temperature, water salinity, water pH, water pressure, etc. surrounding the structure 302. In some examples, the sensors are coupled to the structure 302. For example, the sensors can be coupled to the outside of the structure 302 and can travel with the structure 302. In some examples, the sensors are located proximate to the structure 302. For example, the sensors can be placed along an expected path of the structure 302.

The control system can control the propulsion system of the structure 302 according to certain parameters associated with the live marine life 304. In some examples, the control system controls the propulsion system of the structure 302 based on parameters associated with the seaweed cargo 304. These viability profiles can vary based on the seaweed cargo 304. For example, giant kelp 304 can have a different set of parameters than red kelp 304. The parameters include parameters associated with the health and wellbeing of the seaweed 304. For example, the parameters can include a range of acceptable macronutrient levels, salinity levels, oxygen levels ($O_2$ levels), water temperature, water pH, etc. In some examples, the parameters are linked to each other. For example, the range of acceptable $O_2$ levels can change according to the water temperature.

The control system can control the propulsion system of the structure 302 based on the parameters by comparing the parameters with readings taken from the sensors. For example, the control system can receive sensor readings indicating that the water temperature surrounding the structure 302 is under the minimum acceptable water temperature for the seaweed 304 in the parameters and can determine navigation parameters based on these sensor readings. The control system can then can control the propulsion system to navigate the structure 302 to a different area of the body of water in which the structure 302 is submerged based on the navigation parameters.

In some implementations, the control system can control the propulsion system of the structure 302 to navigate in an orientation that minimizes drag or resistance through the water. For example, the control system can control the propulsion system of the structure 302 to turn such that the long lines of the structure 302 are parallel to the direction of travel.

The navigation parameters can include depths, locations, bearings, etc. For example, the navigation parameters can include a new depth for the structure 302. The control system can control the propulsion system based on the new depth to raise or lower the structure 302 within a water column.

In some examples, the sensors can provide the control system with predicted values of certain parameters. For example, the sensors can determine that the water in which the structure 302 will be within a day has a salinity above the maximum acceptable salinity for the live marine life 304. The sensors can provide the predicted reading to the control system, and the control system can determine navigation parameters that are used to control the propulsion system of the structure 302 to navigate away from that area of water.

The control system can receive data readings from sensors to forecast health parameters of the seaweed 304. For example, the control system can receive data from the sensors that indicate that a particular amount of additional growth will occur within the next three weeks. The control system can perform this forecasting using machine learning and by analyzing parameters such as current biomass, environmental parameters, etc. In some implementations, the control system can determine the biomass of the seaweed 304 using techniques including analyzing load cell readings from the support structures of the structure 302, analyzing buoyancy readings of the seaweed 304, and analyzing motion data from the support structures of the structure 302, such as the damping and/or frequency of the support structures.

The control system can receive data readings from sensors of areas of water in which the cage will be within a certain period of time in real-time. For example, the control system can communicate with sensors located in an area of water by which the structure 302 will pass within an hour and determine that the $O_2$ level is within the optimal range for the live marine life 304 based on the viability profile. The control system can determine navigation parameters that are used to control the propulsion system of the structure 302 to navigate the structure 302 to the area of water and can control the structure 302 to remain in the area of water for a period of time.

The control system can receive data readings from sensors in real-time and determine navigation parameters in real-time. For example, if a data reading is received indicating undesirable conditions based on the viability profile, the control system can determine new navigation parameters in real-time to navigate away from the area of water.

In some examples, readings from sensors can indicate weather conditions, such as lightning, hurricanes, tropical storms, tornados, tsunamis, etc. For example, the control system can receive data readings from sensors indicating that the structure 302 will be entering the area of a hurricane within three hours and determine new navigation parameters to steer the structure 302 away from the hurricane or dive to a depth that avoids a threshold amount of the storm's force.

In some examples, readings from the sensors can indicate obstacles, such as ships, wreckage, reefs, shorelines, other farms, etc. For example, the control system can receive data readings from sensors indicating that the structure 302 will be navigating into a garbage patch and determine new navigation parameters to steer the structure 302 away from the garbage patch.

In some examples, the control system can receive readings from the sensors indicating vital parameters of the seaweed 304. For example, the readings can include average size of the seaweed 304, average level of maturity of the seaweed 304, proportion of the seaweed 304 suspected of having disease, etc. The control system can determine navigation parameters based on these readings and based on the parameters. For example, if the proportion of the seaweed 304 suspected of being diseased is higher than a certain threshold, the control system can determine navigation parameters that are used to steer the structure 302 to a medical station or a docking station. In some examples, if the proportion of the seaweed 304 that is dead is higher than a certain threshold, the control system can determine navigation parameters that are used to steer the structure 302 to a location, such as the starting location 306.

In some examples, the control system can receive data readings from sensors indicating that a parameter of the seaweed 304 is outside of an acceptable range, and can determine navigation parameters that are used to steer the structure 302 to change the parameter. For example, the control system can determine that the nitrogen absorption rate of the seaweed 304 is below a certain threshold, and can determine navigation parameters used to steer the structure 302 to an area of water with warmer water temperatures to increase absorption rate.

The control system can control a life support system of the structure 302 that includes systems such as a feeding mechanism. In some examples, the feeding mechanism is an embodiment of the feeding mechanism described with respect to FIGS. 1-2. For example, the control system can receive data readings from sensors indicating that the average biomass of the seaweed 304 is below an acceptable level, and control the feeding mechanism to dispense more key nutrients such as iron.

The process 300 continues on day 10. In this example, the seaweed 304 are in an early stage of development. The structure 302 has kept the seaweed 304 alive, but the structure 302 is heading for a hurricane 310. The control system can receive readings from sensors indicating that the hurricane 310 is ahead, and can determine new navigation parameters. In this example, the navigation parameters are used to control the propulsion system of the structure 302 to navigate away from the hurricane 310.

In this example, there is an area of water with high salinity 312 to the North East with strong currents 314. There is also a trench 316 with deep water and high water pressure and surrounded by an area of low water temperature 318. The control system can determine, based on the parameters, that the seaweed 304 cannot survive the high salinity of the area 312. The control system can also determine, based on the parameters, that the live marine life 304 can survive the high water pressure of the trench 316 and low water temperature of the area 318. The control system can then determine new navigation parameters that are used to control the propulsion system of the structure 302 to navigate away from the hurricane 310 and the area 312 and through the trench 316 and area 318.

The process 300 continues on day 30. In this example, the seaweed 304 have grown and are still in an early stage of development. The structure 302 is navigating through the trench 316 and the area of low water temperature 318. In this example, the structure 302 is headed for an area with strong currents 314. The control system can receive readings from sensors indicating that the seaweed 304 are healthy, and that water conditions of the area of water into which the structure 302 will be navigating over the next few weeks are favorable based on the parameter. The control system can then determine navigation parameters that allow the structure 302 to drift with the strong currents 314 to conserve power used to control the propulsion system of the structure 302.

The process 300 continues on day 80. In this example, the seaweed 304 have grown. The structure 302 has drifted on the strong currents 314 and is navigating toward the destination location 322. The control system can receive readings from sensors indicating the location of the structure 302 relative to the destination location 322. In some examples, the control system can determine that the structure 302 has completed an acceptable portion of the journey to the destination location 322, and that the structure 302 can continue at the same pace. In some examples, the control system can determine that the structure 302 has completed too large a portion of the journey to the destination location 322 and can determine navigation parameters that are used to control the propulsion system of the structure 302 to navigate more slowly. In some examples, the control system can determine that the structure 302 has completed too small a portion of the journey to the destination location 322 and can determine navigation parameters that are used to control the propulsion system of the structure 302 to navigate more quickly toward the destination location 322.

In this example, the control system determines new navigation parameters that are used to control the propulsion system to steer the structure 302 away from the area 320 and into the strong currents 314. While the strong currents 314 are toward the area 320, the control system can determine new navigation parameters that are used to control the propulsion system to fight the strong currents 314 such that the structure 302 is steered away from the area 320.

The process 300 continues on day 110. In this example, the seaweed 304 has grown and is in a later stage of development. The structure 302 has navigated around the area with low $O_2$ levels 320 and is continuing to navigate toward the destination location 322. In this example, the control system determines that the structure 302 has completed an acceptable portion of the journey toward the destination location 322, and that the seaweed 304 has reached an acceptable maturity level based on the parameters and data readings received from sensors. The control system determines navigation parameters to allow the structure 302 to continue toward the destination location 322.

In some examples, the control system continually determines new navigation parameters for the structure 302. In some examples, the control system determines whether to update the navigation parameters, and will not change previously determined parameters if the control system determines that no update to the navigation parameters is needed.

The process 300 concludes on day 180. The seaweed 304 have reached an acceptable level of growth and are of acceptable levels of health based on the parameters. For example, the control system can determine based on readings from sensors that the seaweed 304 have reached an acceptable biomass and are ready to be harvested. The control system can then determine navigation parameters used to control the propulsion system to deliver the live marine life 304 to the destination location 322.

Figure 4:
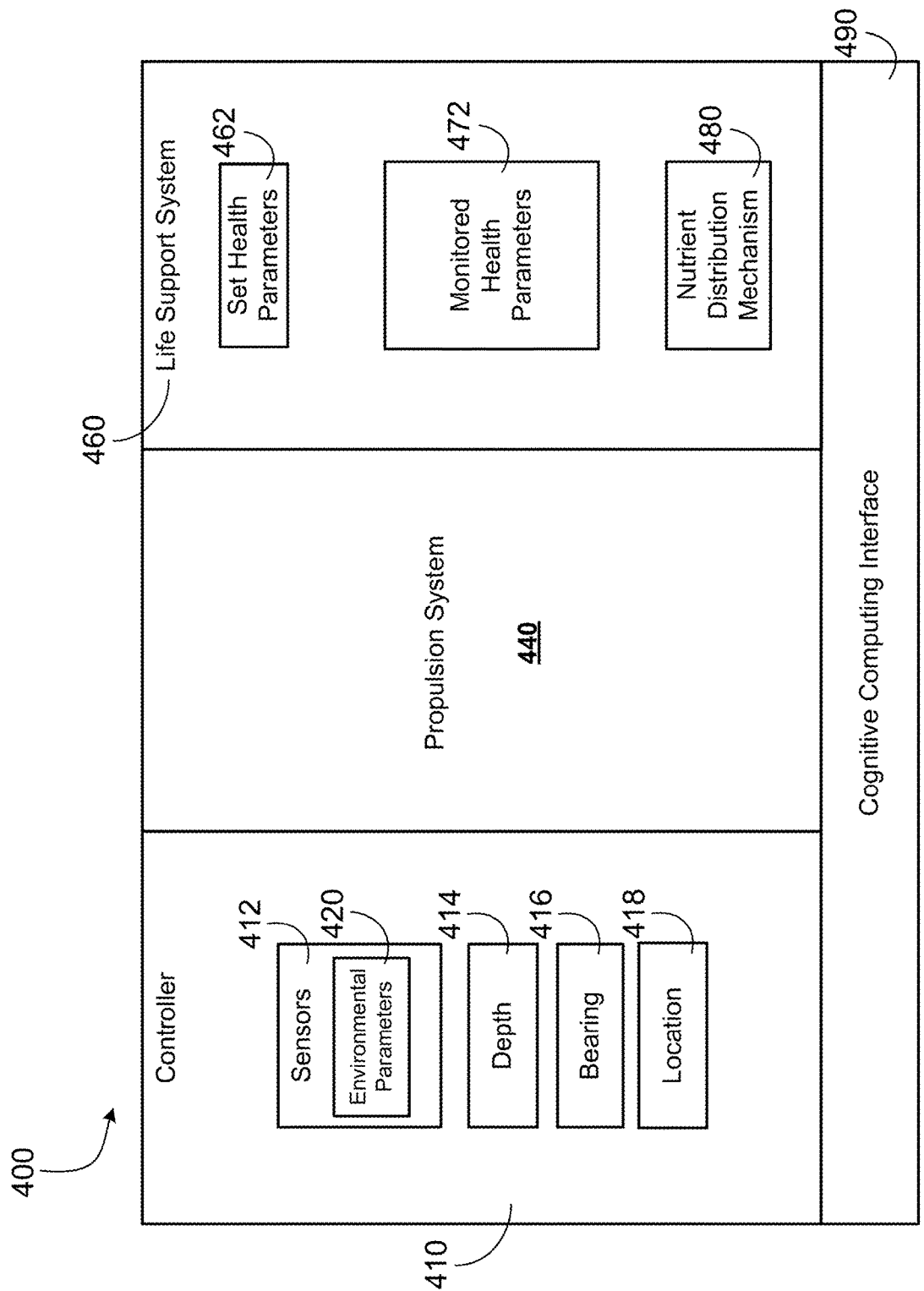
FIG. 4 is a diagram of an example control system of an autonomous submersible structure.

FIG. 4 is a diagram of an example control system 400 of an autonomous submersible structure. In some examples, the autonomous submersible structure is an embodiment of the autonomous submersible structure described with respect to FIGS. 1-3. The control system 400 includes a controller 410, a propulsion system 440, and a life support system 460. The controller 410, the propulsion system 440, and the life support system 460 are each communicably connected to a cognitive computing interface 490. The interface 490 is configured to transmit data to and receive data from each of the controller 410, the propulsion system 440, and the life support system 460. The interface 490 facilitates communication between each of the controller 410, the propulsion system 440, and the life support system 460. The controller 410 can be an implementation of the controller 110 as described above with respect to FIGS. 1-3.

The controller 410 receives inputs from multiple sources, including a sensor input 412. The sensor input 412 includes an environmental parameter input 420. In some examples, the controller 410 receives inputs from more sources. For example, the controller 410 can receive input directly from a human operator. In some examples, the controller 410 receives inputs from different sources. For example, the controller 410 can receive input from models that produce predicted values of inputs. In some examples, the controller 410 receives inputs from fewer sources. For example, the controller 410 can receive one sensor input 412.

The controller 410 can use inputs such as the season or time of day to generate control signals. For example, the controller 410 can determine that because it is July, the body of water in which the autonomous submersible structure is navigating is likely to have stormy conditions, and that in order to avoid damage from the storm, the structure should move to a different body of water. The controller 410 can then generate control signals for propellers of the propulsion system 420 to navigate to a different body of water. In some implementations, the controller 410 can determine that because the sun has set, the seaweed cargo 104 should be lowered for luxury uptake of various macronutrients. The controller 410 can then generate control signals for a system of cables and winches to lower the structure deeper into the body of water.

The controller 410 uses each input it receives to determine one or more navigation parameters. For example, the controller 410 can use the input 412 to determine a depth 414, a bearing 416, and a location 418. In some examples, the sensor input 412 includes data indicating navigation parameters such as the current depth, bearing, and location of the autonomous submersible structure, etc. In some examples, the controller 410 determines more parameters. In some examples, the controller 410 determines different parameters. For example, the controller 410 can determine a speed, a distance to travel, a time period, etc. In some examples, the controller 410 determines fewer parameters. For example, the controller 410 can determine a bearing 416.

The sensor input 412 can be input received from one or more sensors. In some examples, the sensors that provide the sensor input 412 are an embodiment of the sensors and communications system 112 described with respect to FIGS. 1-2. The sensor input 412 can include predicted values of certain parameters, such as the future salinity of an area of water the autonomous submersible structure is currently traversing. In some examples, the sensor input 412 can be outputs of a statistical model of a certain parameter, such as the predicted strength of a current.

The sensor input 412 can include values of certain parameters collected in real-time. For example, the environmental parameters 420 of the sensor input 412 can include the $O_2$ level of an area of water, the temperature of an area of water, etc. In some examples, the values are collected for an area of water the autonomous submersible structure is currently traversing. In some examples, the values are collected for an area of water the autonomous submersible structure will traverse in the future. For example, the control system can communicate with sensors located in an area of water by which the autonomous submersible structure will pass within an hour.

The sensor input 412 can include values of certain parameters that indicate weather conditions. For example, the environmental parameters 420 can include data indicating weather conditions such as lightning, hurricanes, tropical storms, tornados, tsunamis, etc. For example, the environmental parameters 420 can include data from local weather stations. In some examples, the controller 410 can determine weather conditions from a combination of the sensor input 412 received. For example, the controller 410 can use a combination of the sensor input 412 received to determine that a currently active hurricane will cross paths with the autonomous submersible structure on its current trajectory.

In some examples, the sensor input 412 can indicate obstacles. For example, the environmental parameters 420 of the sensor input 412 can indicate obstacles such as ships, wreckage, reefs, etc. In some examples, the environmental parameters 420 of the sensor input 412 can indicate the boundaries of a current. For example, the environmental parameters of the sensor input 412 can include density and temperature data for an area of water that the controller 410 can use to determine the boundaries of a deep current. In some examples, the environmental parameters 420 can include image or video input. In some examples, the controller 410, the cognitive computing interface 490, or a remote server to which the controller 410 is communicatively coupled can process the sensor input 412 to determine whether the autonomous submersible structure is approaching an obstacle. For example, the sensor input 412 can include image data of a large garbage patch directly in the path of the autonomous submersible structure. The controller 410 can process the sensor input 412 and use image recognition to determine that there is an obstacle that needs to be avoided, and determine one or more navigation parameters that are used to avoid the obstacle.

In some examples, the sensor input 412 can include health parameters of the live cargo of the autonomous submersible structure. For example, the sensor input 412 can include the overall biomass of the seaweed cargo, the average protein of the seaweed cargo, etc. In some examples, the controller 410, the cognitive computing interface 490, or a remote server to which the controller 410 is communicatively coupled can process the sensor input 412 to determine the health parameters of the live cargo of the autonomous submersible structure.

The depth output 414 indicates a depth in water of the autonomous submersible structure. The depth output 414 can be measured as a depth from the surface of the water, from the bottom of the ocean, etc. The depth output 414 is determined by the controller 410, and is used to control the propulsion system 440 to navigate the autonomous submersible structure in the body of water in which the structure 100 is submerged. In some examples, the depth output 414 is determined by the controller 410 using the sensor input 412. For example, the controller 410 can determine the boundaries of a strong current in a direction opposite to the current bearing of the autonomous submersible vehicle, and determine that if the autonomous submersible structure sank in depth by five feet, the structure would be able to steer out of the strong current.

The controller 410 can use machine learning methods to process and analyze sensor information to generate control signals for the propulsion system 420 that optimize growth of the seaweed cargo. For example, the controller 410 can use the health parameters to determine when to lower and when to raise the structure to achieve a specific biological composition for the seaweed cargo. The controller 410 can generate control signals to navigate the structure to locations within a body of water that have various concentrations of nutrition and light exposure to optimize, for example, specific contents of the seaweed cargo being supported by the structure such as polysaccharides, protein, etc. In some implementations, the controller 410 can use the input 412 as input to machine learning models that can output predicted seaweed growth and optimal growth parameters.

The controller 410 can use machine learning models. These models may be models which accept sensor data collected by cameras and/or other sensors as inputs. The machine learning models may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the machine learning models may use supervised learning. In some examples, the machine learning models use unsupervised learning.

The bearing output 416 indicates a bearing of the autonomous submersible structure. The bearing output 416 can include a direction of motion of the autonomous submersible structure, a direction of a distant object relative to the current course of the autonomous submersible structure, degrees away from North of a distant point relative to the current position of the autonomous submersible structure. The bearing output 416 is determined by the controller 410, and is used to control the propulsion system 440 to navigate the autonomous submersible structure in the body of water in which the structure 100 is submerged. In some examples, the bearing output 416 is determined by the controller 410 using the sensor input 412. For example, the controller 410 can determine the location of a hurricane along the course of travel of the autonomous submersible structure, and determine that if the autonomous submersible structure changed bearing by three degrees toward North, the structure would be able to steer around the hurricane.

The location output 418 indicates a destination location of the autonomous submersible structure. The location output 418 can include global coordinates, an address, etc. The location output 418 is determined by the controller 410, and is used to control the propulsion system 440 to navigate the autonomous submersible structure in the body of water in which the structure is submerged. In some examples, the location output 418 is determined by the controller 410 using the sensor input 412.

The location output 418 can be the current location of the autonomous submersible structure. For example, the controller 410 can determine that environmental conditions, such as salinity and $O_2$ levels are ideal according to one or more viability profiles 462 used by the control system 400. The controller 410 can then determine that the autonomous submersible structure has completed an acceptable portion of the journey to the destination location and that the autonomous submersible structure can remain geostationary at its current location.

The location output 418 can be a destination location of the autonomous submersible structure. For example, the controller 410 can determine that the autonomous submersible structure has completed an acceptable portion of the journey to the destination location and that the autonomous submersible structure can proceed to the original destination location determined. In this example, the controller 410 does not determine a new location output 418, and instead retains the original destination location as the location output 418.

The interface 490 is configured to transmit data to and receive data from the controller 410 and the propulsion system 440 such that the navigation parameters determined by the controller 410 are used to control the propulsion system 440.

The propulsion system 440 receives input from multiple sources, including the controller 410. For example, the propulsion system 440 can receive a control signal from the controller 410. In some examples, the propulsion system 440 can receive the one or more navigation parameters determined by the controller 410 and determine a control signal that controls the components of the propulsion system 440. In some examples, the cognitive computing interface 490 receives the one or more navigation parameters determined by the controller 410 and determines a control signal for the propulsion system 440.

In some examples, the propulsion system 440 includes a controller that controls all components of the propulsion system 440. For example, the propulsion system 440 can include a central controller that transmits control signals to each of the engine 442, the independently controlled propellers 444, the air tank 446, and the ballast 448. In some examples, the propulsion system 440 includes a controller for each component of the propulsion system 440. For example, the propulsion system 440 can include a separate controller that transmits control signals to each of winches and cables, an engine, independently controlled propellers, an air tank, and a ballast.

The independently controlled propellers can be propellers positioned on the exterior of the autonomous submersible structure that are controlled to propel the autonomous submersible structure through the body of water in which the structure 100 is submerged. In some examples, the independently controlled propellers are an embodiment of the propellers of the propulsion system 120 as described with respect to FIGS. 1-3. In some examples, the independently controlled propellers are controlled by the propulsion system 440 to steer the autonomous submersible structure. The independently controlled propellers can be controlled to change the steering, speed, etc. of the autonomous submersible structure.

The independently controlled propellers can be controlled by the propulsion system 440 based on the one or more navigation parameters determined by the controller 410. For example, the cognitive computing interface 490 can receive the one or more navigation parameters determined by the controller 410 and generate a control signal for the independently controlled propellers. In some examples, the propulsion system 440 can receive the one or more navigation parameters and generate a control signal for the independently controlled propellers.

The air tank can be a tank filled with air that is used to blow water out of the autonomous submersible structure. In some examples, the air tank contains compressed air that forces water out of the ballast. The air tank can push water through valves of the autonomous submersible structure to increase the buoyancy of the autonomous submersible structure. In some examples, the air tank can be controlled by the propulsion system 440 based on the one or more navigation parameters determined by the controller 410. For example, the air tank can be controlled to force air out of the ballast based on a change in depth that decreases the depth of the autonomous submersible structure.

The ballast can be a compartment within the autonomous submersible structure that holds water to provide stability for the submersible structure. In some examples, the ballast can be controlled by the propulsion system 440 based on the one or more navigation parameters determined by the controller 410. For example, the ballast can be pumped with water to decrease buoyancy of the autonomous submersible structure if the depth output 414 determined by the controller 410 requires an increase in depth of the autonomous submersible structure.

The life support system 460 includes set health parameters 462, monitored health parameters 470, and nutrient distribution mechanism 480. The monitored health parameters 470 can include the overall biomass of the seaweed cargo, the protein level of the seaweed cargo, etc. The life support system 460 monitors and maintains the integrity of cargo supported by the autonomous submersible structure.

The set health parameters 462 include parameters associated with the health and wellbeing of the cargo of the autonomous submersible structure, such as a range of acceptable salinity levels, $O_2$ levels, water temperature, water pH, etc. The parameters of the set health parameters 462 can be linked to each other. For example, an acceptable range of water temperature for a certain kind of live cargo can increase based on a decrease in salinity.

The control system 400 can control the propulsion system 440 of the structure 302 based on the set health parameters 462 by comparing the set health parameters with the sensor inputs 412 or the monitored health parameters 472. In some examples, the cognitive computing interface 490 can control the propulsion system 440 according to the navigation parameters determined by the controller 410. For example, the cognitive computing interface 490 can determine from sensor inputs and the navigation parameters determined by the controller 410, that the $O_2$ levels in the area of water the autonomous submersible structure is currently traversing is within the ideal range of $O_2$ levels specified in the viability profile 462 used by the control system 400 to control the autonomous submersible structure.

The control system 400 can use more than one collection of set health parameters 462. For example, the control system 400 can select a collection of set health parameters 462 based on the portion of the journey to the destination location completed by the autonomous submersible structure. In some examples, the control system 400 can select a collection of set health parameters 462 based on the cargo contained within the autonomous submersible structure. In some examples, the control system 400 can automatically select a collection of set health parameters from the multiple collections of set health parameters 462 based on the one or more navigation parameters determined by the controller 410. For example, the control system 400 can select a collection of set health parameters 462 based on destination location output 418 determined by the controller 410.

The monitored health parameters 470 are monitored by the life support system 460. In some examples, the monitored health parameters 470 are included in the sensor input 412 collected by the controller 410. For example, the monitored health parameters 470 can be determined from image data collected by sensors and included in the sensor input 412. The monitored health parameters 470 can be an embodiment of the health parameters described with respect to FIG. 3. In some examples, the monitored health parameters 470 are collected as raw data. For example, the monitored health parameters 470 can include the amount of food consumed each day. In some examples, the monitored health parameters 470 can be determined from raw sensor data collected. For example, the monitored health parameters 470 can include the proportion of live cargo contained in the autonomous submersible structure that is healthy. In some examples, the life support system 460 uses techniques such as machine learning to determine certain monitored health parameters 470. The life support system 460 can use any of a variety of models such as decision trees, linear regression, neural networks, Bayesian networks, etc., and can be trained using a variety of approaches, such as deep learning, inductive logic, support vector machines, clustering, etc. For example, the life support system 460 can determine monitored health parameters 470 such as the overall biomass of the cargo 472 through image recognition. In some examples, the monitored health parameters 470 are included as parameters of the set health parameters 462.

In some examples, the cognitive computing interface 490 uses the monitored health parameters 470 to generate and/or update the set health parameters 462. For example, the cognitive computing interface 490 can determine that a set health parameter has reached a new maximum, and that a new set health parameter 462 should be used by the controller 410 and the cognitive computing interface 490 to steer the autonomous submersible structure.

The nutrient distribution mechanism 480 can be monitored and controlled by the life support system 460. In some examples, the nutrient distribution mechanism 480 is an embodiment of the feeding mechanism described with respect to FIGS. 1-2. In some examples, the nutrient distribution mechanism 480 includes a mechanism that can be controlled by the life support system 460 or the controller 410 to distribute nutrients to the seaweed cargo supported by the autonomous submersible structure.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. An apparatus comprising:
a submersible structure configured to support live marine algae thereon;
a propulsion system attached to the submersible structure, the propulsion system configured to propel the submersible structure; and
a controller configured to;
receive, from multiple sensors, sensor data associated with the marine algae,
select a subset of the sensor data based on environmental conditions in a water body,
determine, based on the selected subset of the sensor data, one or more parameters indicative of growth and health of the marine algae, and
control the propulsion system to steer the submersible structure within the water body, the controller controlling the propulsion system in accordance with the one or more parameters indicative of growth and health of the live marine algae, the one or more parameters comprising a current, monitored biomass of the live marine algae.

2. The apparatus of claim 1, wherein the live marine algae is seaweed, and the one or more parameters include a color of the seaweed.

3. The apparatus of claim 1, wherein the controller is configured to control the propulsion system further based on one or more parameters of the water body.

4. The apparatus of claim 3, wherein the one or more parameters of the water body pertain to a current in the water body, and the controller is configured to:
receive, from one or more sensors, data indicative of the one or more parameters pertaining to the current;
analyze the one or more parameters pertaining to the current to predict a path of the current; and
generate a control signal for the propulsion system in accordance with the predicted path of the current.

5. The apparatus of claim 4, wherein predicting a path of the current comprises predicting a fork in the path of the current, and wherein the control signal is configured to steer the submersible structure along a prong of the fork.

6. The apparatus of claim 1, wherein the controller is configured to:
send a control signal to the propulsion system;
receive, responsive to sending the control signal, feedback from the propulsion system acting in accordance with the control signal; and
generate an updated control signal for the propulsion system in accordance with the feedback.

7. The apparatus of claim 6, wherein the feedback comprises information on an amount of resistance encountered by the propulsion system.

8. The apparatus of claim 1, wherein the controller is configured to control the propulsion system to steer the submersible structure by moving the submersible structure in a vertical direction within the water body.

9. The apparatus of claim 1, wherein the controller is configured to control one or more portions or protrusions or the submersible structure to affect an amount of drag on the submersible structure.

10. The apparatus of claim 1, further comprising a mesh netting disposed around at least a portion of the submersible structure, the mesh netting configured to prevent the marine algae from being separated from the submersible structure.

11. The apparatus of claim 1, wherein the controller is configured to determine, based on the one or more parameters, a schedule for changing positions of the submersible structure within the water body, and generate control signals for the propulsion system in accordance with the schedule.

12. The apparatus of claim 1, wherein the controller is configured to control the propulsion system to hold the submersible structure geostationary.

13. The method of claim 1, wherein the live marine algae is seaweed, and the one or more parameters include a particular level or protein or chemical that is to be achieved for the seaweed.

14. A computer-implemented method comprising:
receiving, from multiple sensors, sensor data associated with live marine algae that is supported by a submersible structure;
selecting a subset of the sensor data based on environmental conditions in a water body;
determining, based on the selected subset of the sensor data, one or more parameters indicative of growth and health of the live marine algae that is supported by the submersible structure, the one or more parameters comprising a current, monitored biomass of the live marine algae; and
controlling, by a controller, a propulsion system to steer the submersible structure within the water body, the controller controlling the propulsion system in accordance with the one or more parameters indicative of the growth and health of the live marine algae, and the propulsion system being attached to the submersible structure and being configure to propel the submersible structure.

15. The computer-implemented method of claim 14, wherein the live marine algae is seaweed, and the one or more parameters include a color of the seaweed.

16. The computer-implemented method of claim 14, wherein the controller is configured to control the propulsion system further based on one or more parameters of the water body.

17. The computer-implemented method of claim 16, wherein the one or more parameters of the water body pertain to a current in the water body, and the controller is configured to:
receive, from one or more sensors, data indicative of the one or more parameters pertaining to the current;
analyze the one or more parameters pertaining to the current to predict a path of the current; and
generate a control signal for the propulsion system in accordance with the predicted path of the current.

* * * * *